Patented Oct. 8, 1935

2,016,594

UNITED STATES PATENT OFFICE 2,016,594

MOLDABLE UREA-FORMALDEHYDE REACTION PRODUCT AND PROCESS OF PREPARING SAME

Melville C. Dearing, Palatine, Ill., assignor to Economy Fuse & Manufacturing Company, Chicago, Ill., a corporation of New York No Drawing. Application September 6, 1932, Serial No. 631,898

2 Claims. (Cl. 260—3)

This invention relates to reaction products of urea and formaldehyde and particularly to products in powdered form which can be molded under combined heat and pressure to form infusible and insoluble mechanically and hot water resistant objects.

This invention relates further to the process of producing the reaction products above referred to and also to the process of producing final molded objects therefrom and to the final molded objects themselves.

It is an object of this invention to provide a process which is productive of a reaction product of urea and formaldehyde existing in a powdered form adapted for molding under heat and pressure to form final molded objects possessing high water resistance.

It is a further object of this invention to provide, in addition to the aforementioned process, the additional steps of heating and molding productive of the final molded objects.

It is a further object to provide a urea-formaldehyde reaction product existing in a powdered form capable of producing new and different final molded objects having high water resistance.

In applicant's co-pending application, Serial No. 630,700, filed August 27, 1932, entitled "Urea-formaldehyde reaction products" there is described a process of preparing a moldable reaction product comprising the lowering of the formaldehyde concentration of the initial solution to such an extent that upon appropriate dilution, separation of a water insoluble reaction product occurs; diluting and washing and drying the separated product.

In applicant's co-pending application, Serial No. 631,899, filed September 6, 1932, entitled "Water-insoluble urea-formaldehyde reaction products and process for preparing same", there is described a process involving the addition of acid to the water used for diluting, whereby as a result, the hot water resistance of molded products prepared from the reaction products is materially increased. It is however, essential to said last process to obtain a highly reacted intermediate product, as by prolonged heat treatment, before diluting by pouring into acidulated water. It has been found by numerous experiments that intermediate products which are not highly reacted or advanced as called for in said co-pending application, give precipitates which are incapable of being molded into objects resistant to boiling water.

This may be illustrated by the following example. An initial reaction product prepared from 200 parts of 40% formaldehyde, the pH of which had been adjusted to 5 and 76 parts of urea (added portionwise) was boiled under a reflux condenser for 1½ hours. It was then distilled to a syrupy condition and poured into 1000 parts of acidulated water having a pH of 1.5. A molded object produced from the separated product was softened somewhat by immersion in boiling water. The temperature of molding in the above case was nearly 140 degrees C. and the time of molding was 8 minutes.

In accordance with the present invention, it has been found by further experimentation that completely hot water resistant products can be obtained by dilution with acidulated water provided the initial product is diluted immediately after its formation or before secondary reactions have time to occur. An example will illustrate this statement.

To 100 parts of 40% formaldehyde (pH 5.0) heated to boiling were added 20 parts of urea. After one minute 10 parts of urea were added and after another minute, 6 parts of urea were added. The addition of the urea in each case caused boiling of the solution. After the final addition of urea the ebullition was allowed to cease (about 5 minutes were required) and the solution was immediately poured into a large volume of water previously acidulated as for example with hydrochloric acid to a pH of 1.5. An immediate separation of a fibrous product occurred. This product upon washing became amorphous. After drying at room temperature it was molded under the conditions above described to form a completely hot water resistant product. By completely hot water resistant is meant that no softening of the molded object could be detected after 20 minutes immersion in boiling water.

The essential feature of this process is the dilution immediately after the initial reaction between the urea and formaldehyde has occurred. It cannot be explained why a more hot water resistant product can be obtained in that manner but numerous experiments have confirmed the fact. It may be that with continued heating secondary reactions occur which result in a less hot water resistant product. On the other hand the effect of these secondary reactions may be overcome to a large extent by elimination of at least a portion of the uncombined formaldehyde as pointed out in said co-pending applications.

This process is not limited to any definite pH or ratio of urea to formaldehyde. By way of illustration, it may be said that powders have been prepared capable of being molded into hot water resistant products in the following ways.

First, from 100 parts of formaldehyde (pH 5) and 50 parts of urea; second, from 200 parts of formaldehyde (pH 6.8) and 76 parts of urea; third, from 200 parts formaldehyde (pH 7.0) and 76 parts of urea; and fourth, 300 parts of formaldehyde (pH 5.0) and 120 parts of urea. In all these cases 40% formaldehyde is referred to.

This process admits of a considerable number of variations which will readily occur to those skilled in this art and such variations are to be considered as coming within the scope of this invention. For example, acid may be added to the initial product immediately after formation and just before dilution. If the ratio of urea to formaldehyde is high, dilution must immediately follow the addition of the acid or gelation will occur.

As a rule, quite so good results have not been obtained by adding to the initial solution a quantity of acid sufficient to produce a pH of 1.5 in the diluent water, and then pouring into neutral water. The reason for this is probably because the acid is hindered from proper diffusion by the separated urea product, and therefore there is established locally in the vessel, zones in which the water is much less acid than corresponds to a pH of 1.5. This condition might be prevented by more vigorous stirring. In any case, however, this is regarded as a mere variant of the invention when done under such conditions that a completely hot water resistant molded product can be obtained.

The volume of water used in this process can be varied within wide limits. In general it is preferable to use a volume not less than three times that of the initial reaction product solution, nor more than ten times that volume.

Thiourea may be substituted in part for urea but the conditions of the initial reaction should be varied as a rule, on account of the fact well known to the art, that urea and thiourea behave quite differently when reacted with formaldehyde.

I claim:

1. The process of producing a moldable precipitate which comprises reacting in molecular ratio of substantially one to two, urea and 40% aqueous formaldehyde by bringing the same to reaction temperatures and by adding the urea in small increments at a time and allowing ebullition to subside after each addition and before the next increment of urea is added, and after ebullition of the last addition of urea has ceased then immediately diluting the reaction product with a relatively large volume of acidulated water having a pH of approximately 1.5, and thereafter washing and drying the precipitate so produced.

2. A heat and pressure hardened product resistant to boiling water produced by heat hardening the precipitate resulting from the process defined in claim 1.

MELVILLE C. DEARING.